(12) United States Patent
Stenton

(10) Patent No.: US 6,559,948 B1
(45) Date of Patent: May 6, 2003

(54) METHOD FOR LOCATING A STRUCTURE USING HOLOGRAMS

(75) Inventor: Conrad Stenton, Midland (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/343,289

(22) Filed: Jun. 30, 1999

(51) Int. Cl.⁷ .................................................. G01B 9/02
(52) U.S. Cl. ........................ 356/457; 356/458; 356/399
(58) Field of Search ................................ 356/457, 458, 356/510, 399–401

(56) References Cited

U.S. PATENT DOCUMENTS

| | | | | |
|---|---|---|---|---|
| 4,466,693 A | * | 8/1984 | Matsuda et al. | 350/3.6 |
| 4,712,851 A | * | 12/1987 | Fusek et al. | 359/1 |
| 5,274,479 A | * | 12/1993 | Zmek et al. | 359/15 |
| 5,530,547 A | * | 6/1996 | Arnold | 356/458 |

* cited by examiner

Primary Examiner—Samuel A. Turner
Assistant Examiner—Philip Natividad
(74) Attorney, Agent, or Firm—William C. Schubert; Glenn H. Lenzen, Jr.

(57) ABSTRACT

A structure (22) is located relative to a reference surface (26a, 42) using an optical target (28) affixed to the structure (22) and having a reflective angular-reference hologram (30) thereon with an effective angular orientation. An alignment light beam (38) is directed perpendicular to the reference surface (26a, 42) and incident upon the angular-reference hologram (30) on the optical target (28), and a signal return of the alignment light beam (38) is received at a measurement location. The angular orientation of the structure (22) is adjusted to achieve a signal return of the alignment light beam (38) corresponding to an alignment of the alignment light beam (38) to the effective angular orientation of the reflective angular-reference hologram (30). Multiple reflective angular-reference holograms (30) may be spatially superimposed upon each other in the optical target (28) or spatially separated from each other on the optical target (28).

21 Claims, 3 Drawing Sheets

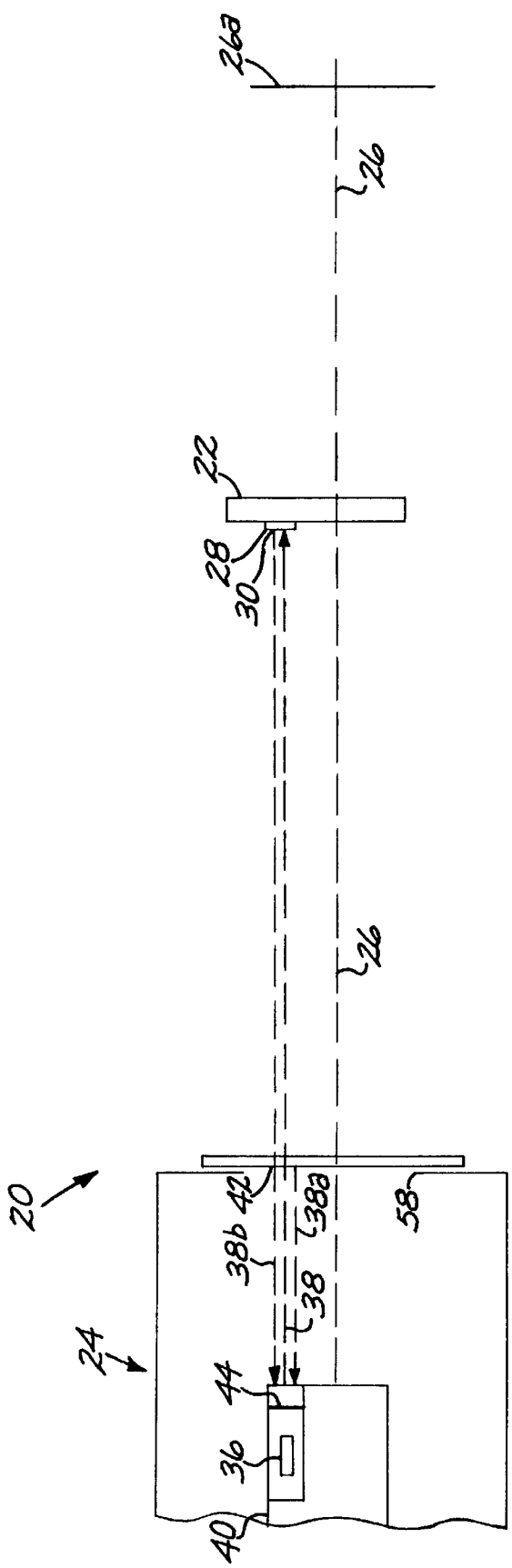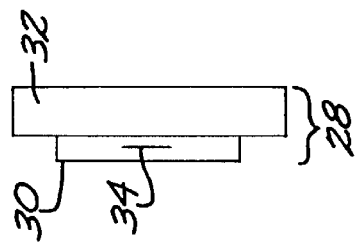

METHOD FOR LOCATING A STRUCTURE USING HOLOGRAMS

BACKGROUND OF THE INVENTION

This invention relates to the precise locating of a structure and, more particularly, to such precise locating using holographic techniques.

Structures such as optical devices must often be angularly located (that is, established) relative to related structures in an optical train. The required locating may involve highly precise establishing of all or some of the various angular degrees of freedom of the structures relative to each other. Such alignments are required for both testing of the optical devices and also in their final service applications.

In one approach used to achieve highly precise locating, a series of optical targets in the form of mirrors or prisms are mounted on the structure to be aligned. Light beams are directed against individual ones of the series of optical targets, the reflected or refracted light beams are received at a sensor, and angular information is determined from the received light beams. The structure is angularly repositioned based upon the measurements, and the measurements may be repeated as necessary. The angular locating by this technique may be made precise to the limits possible with the mounting and optical techniques.

While operable, this approach has several drawbacks. The precise mounting and aligning of several optical targets is often time consuming. The optical targets must typically be located within an aperture viewing area of the measuring device. For some situations, this poses no problem. In others, the aperture viewing area is quite small, and it is physically difficult or impossible to locate all of the required optical targets within the aperture viewing area.

There is a need for an improved approach to the precise locating of structures such as optical devices in optical systems. The improved approach is desirably compatible with small-scale structures where all of the locating structure must be within a small aperture viewing area. The present invention fulfills this need, and further provides related advantages.

SUMMARY OF THE INVENTION

The present invention provides a method for angularly locating a structure relative to a reference surface. The present approach achieves highly precise locating, to optical-quality standards. It is compatible with small, compact systems wherein the aperture viewing area available for accomplishing the locating is small. This technique allows locating to be accomplished to a good standard of precision with the naked eye, or to much higher standards using instrumentation. When instrumentation such as an interferometer is used, the same instrumentation may be utilized when appropriate to measure the quality of the structure being located.

In accordance with the invention, a method for angularly locating a structure relative to a reference surface comprises the steps of providing the structure to be angularly located relative to the reference surface, providing an optical target having a reflective angular-reference hologram thereon with an effective angular orientation, and affixing the optical target to the structure. An alignment light beam is directed against the angular-reference hologram on the optical target, and a signal return of the alignment light beam is received at a measurement location of a measurement device. The angular orientation of the structure is adjusted to vary the signal return to correspond to a locating of the alignment light beam relative to the reference surface.

The angular-reference hologram may be made with an image of a reflective surface such as a mirror, either photographically or synthetically, at an effective angular orientation using well-known techniques. When the angular-reference hologram is viewed, there is a strong reflection from the angular-reference hologram mirror surface only when the angular-reference hologram is viewed from exactly the angular orientation that is perpendicular to the effective angular orientation of the holographic mirror surface. At other angular orientations, there will be little if any reflection. The optical target, and thence the structure to which it is attached, is located to the desired angular orientation by directing a light beam toward the angular-reference hologram (which is affixed to the structure to be located), monitoring the return signal from the angular-reference hologram, and adjusting the angular orientation of the optical target until the maximum intensity of return is observed.

In one preferred embodiment, there are two or more reflective angular-reference holograms, with different effective angular orientations, on the optical target. These multiple reflective angular-reference holograms may be spatially superimposed upon each other, or spatially separated on the optical target. Maximum returns are observed at each angular orientation defined by one of the angular-reference holograms, allowing the optical target and structure to be angularly located with great precision at any of a number of selected discrete angular orientations using the one optical target.

The angular-reference holograms may be quite small in size. The use of small angular-reference holograms and/or spatial superposition of larger angular-reference holograms allows the optical target to be quite small yet fully effective in achieving the locating of the optical target and thence the structure. Even a complex optical target may therefore be accommodated in a small area and within a small aperture viewing area. The single angular-reference hologram or at least one of the multiple angular-reference holograms is desirably oriented to define a reflective perpendicular to the angular-reference hologram and thence to the optical target, and the adjusting step achieves a parallel orientation of the optical target to the reference surface.

The present approach has the important advantage that it may be used with alignment apparatus of varying degrees of sophistication. A quickly obtained, reasonably good approximation of the desired orientation may be achieved with the naked eye. More sophisticated measurement apparatus may be used to improve the precision of angular locating, and wavefront analysis equipment such as an interferometer may be used to locate the optical target to exact angular orientations.

The angular-reference holographic optical target is inexpensive to produce either photographically or virtually with computer-generated holograms. Holographic optical targets may be mass produced, applied to apparatus, and left in place to allow re-alignment at a later time. The optical targets are readily applied to a flat surface, as with an adhesive backing, reducing the time involved for angular alignment as compared with prior approaches which required affixing mirrors or prisms to the structure to be located. The holographic optical targets may instead be removed after use, and later re-applied to the same structure or applied to different structure. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic elevational view of an optical system using a holographic optical target;

FIG. 2 is a schematic sectional view of a holographic optical target with a single discrete orientation of the angular-reference hologram;

DETAILED DESCRIPTION OF THE INVENTION

Figure 3A:
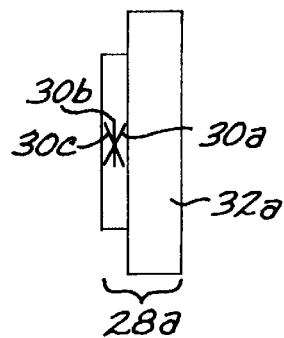
FIG. 3A is a schematic sectional view of a holographic optical target with three discrete angular-reference hologram orientations spatially superimposed.

FIG. 1 depicts an optical system 20 including a structure 22 to be located and a measurement device 24 that is utilized in the locating of the structure 22. The structure 22 may be of any operable type, such as a non-optical structure or an optical-device structure such as a lens. In this case, the measurement device 24 is an interferometer that is used to locate the structure 22, and is also used in the testing of the structure 22. Any operable type of measurement device 24 may be used, including both instruments and the human eye. As will be described, moderately accurate angular locating of the structure 22 may be achieved with the unaided human eye as the measurement device, an important advantage of the invention. More accurate angular locating may be achieved with instrumentation, as described in relation to FIG. 1. A reference axis 26 extending from the measurement device 24, with an associated normal reference surface 26a perpendicular thereto, provides an angular reference for the relative spatial orientation between the measurement device 24 and the structure 22. (A reference axis and a reference surface are equivalent for the present purposes.) An optical target 28 illustrated in FIG. 2 is affixed to the structure 22, at a location where it is in a field of view of the measurement device 24. The optical target 28 has a reflectance angular-reference hologram 30 thereon. The hologram 30 may be mounted to a backing 32, which is in turn affixed to a flat surface of the structure 22 by an adhesive or other means so that the hologram 30 has a known angular relation to the structure 22. The hologram 30 may be as large or as small in size as desired.

The reflectance angular-reference hologram 30 is produced by techniques that are well known in the art. For example, it may be produced in a photographic emulsion, photoresist, or glass. It may be produced using a real object or synthetically using a computer-generated holographic image. The preferred image, whether produced from a real object or synthetically, is of a mirror having a mirror plane 34 illustrated in FIG. 2. Light incident upon the mirror plane 34 is reflected from the mirror plane 34. If the incident light path is perpendicular to the mirror plane 34, the light will be reflected back to its source. If the incident light path is not perpendicular to the mirror plane 34, little light will be reflected back to the light source.

A light source 36 in the measurement device 24 directs a light beam 38 parallel to the reference axis 26 (i.e., perpendicular to the normal reference surface 26a) so as to be incident upon the hologram 30. The light beam 38 reflects from the mirror plane 34 of the hologram 30. If the mirror plane 34 is oriented perpendicular to the reference axis 26 (and thence parallel to the normal reference surface 26a), the light beam 38 is reflected back toward the light source 36.

In a basic version of the measurement device 24, the light source 36 also includes an intensity measurement device. When the intensity measurement device outputs a maximum value, it is known that the mirror plane 34 is perpendicular to the reference axis 26 and parallel to the normal reference surface 26a. When the mirror plane 34 is at any other orientation, the light reflected back to the light source 36 is less.

In a more sophisticated version of the measurement device 24 pictured in FIG. 1, the measurement device 24 includes an interferometer 40. The operation of interferometers is known in other contexts, but generally the interferometer used in the present invention operates as follows. The interferometer 40 includes a partially silvered flat reference surface 42 through which the light beam 38 passes on its way to the optical target 28, and which reflects a reference portion 38a of the light beam 38 back to an imaging light detector 44. The reference surface 42 is preferably oriented to be perpendicular to the reference axis 26 and thence parallel to the normal reference surface 26a, and provides a well-defined angular reference relative to the interferometer 40. An interfering portion 38b of the reflected light beam received back from the optical target 28 passes to the imaging light detector 44. The resulting two-dimensional interference pattern between the reference portion 38a and the reference portion 38b is measured by the detector 44. From the pattern of fringes seen in the interference pattern of the two beam portions 38a and 38b, the angular orientation null point of the mirror plane 34 of the reflective hologram 30, relative to the reference surface 42, is deduced. The angular orientation of the structure 22 may be changed, either manually or with motors, to move the structure 22 to the angular orientation null point.

The reflection hologram approach to the location of the structure 22 is useful where there is a single angular-reference hologram on the optical target 28 as illustrated in FIG. 2, but its greatest value arises when there are two or more angular-reference holograms of different angular orientations on the optical target 28. FIGS. 3A–3B and 4A–B illustrate optical targets 28a and 28b, respectively, each with three angular-reference holograms 30a, 30b, and 30c thereon. The angular-reference holograms 30a, 30b, and 30c are reflective mirror holograms with three different angular orientations, as illustrated schematically in FIGS. 3A and 4A. The angular-reference holograms are supported on backings 32a and 32b, respectively.

Figure 3B:
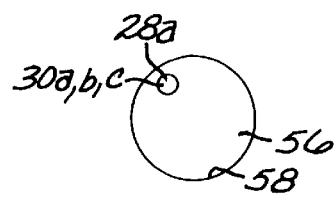
FIG. 3B is a schematic view of the appearance of the holographic optical target of FIG. 3A, viewed through an aperture viewing area.

The optical target 28a of FIGS. 3A and 3B has the three angular-reference holograms 30a 30b, and 30c spatially superimposed, so that they occupy a minimal total area.

Such superposition is possible with holograms but not possible with physical structure such as prisms and physical mirrors. As seen in FIG. 3B, this superimposed angular-reference hologram fits within a minimal area of an aperture viewing area 56 of an aperture 58 of the measurement device 24.

Figure 4A:
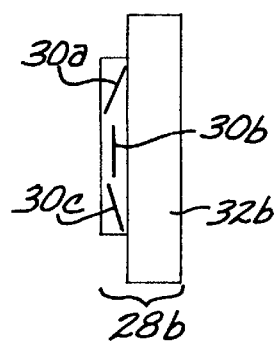
FIG. 4A is a schematic sectional view of a holographic optical target with three discrete angular-reference hologram orientations spatially separated.
Figure 4B:
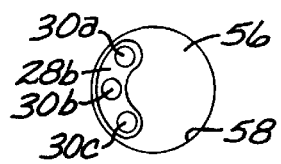
FIG. 4B is a schematic view of the appearance of the holographic optical target of FIG. 4A, viewed through an aperture viewing area.

The optical target 28b of FIGS. 4A and 4B has multiple holograms on the optical target 28b, but the multiple angular-reference holographs are spatially separated laterally relative to the axis 26. These spatially separated reflective angular-reference holograms 30a, 30b, and 30c still fit within a small aperture viewing area 56. As shown in FIG. 4B, the arrangement of the three angular-reference holograms 30a, 30b, and 30c may be selected to conform to an available area on the structure 22, within the aperture viewing area 56.

Figure 5:
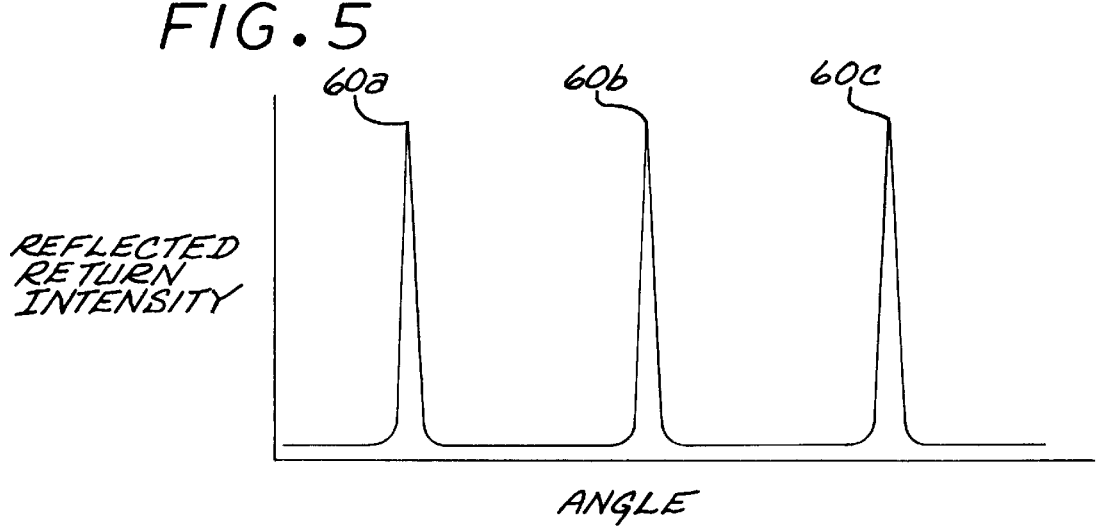
FIG. 5 is a graph of reflected return intensity as a function of angle for the optical targets of FIGS. 4A or 4B.

FIG. 5 illustrates the use of the three angular-reference holograms 30a, 30b, and 30c. The intensity of the return signal is a function of the angular orientation of the structure 22, and thence the optical target 28. The reflected return intensity of the angular-reference hologram 30a is a maximum at peak 60a, the reflected return intensity of the angular-reference hologram 30b is a maximum at peak 60b, and the reflected return intensity of the angular-reference hologram 30c is a maximum at peak 60c. To orient the structure at any of the discrete angular values represented by the angular-reference holograms 30a, 30b, or 30c, the reflected return intensity is measured until the maximum in the respective peak 60a, 60b, or 60c is located. Rotational movement toward the respective maxima is facilitated by the observed interferogram fringe pattern. These angular values are normally separated by a substantial amount, and therefore finding the peaks presents no difficulty.

Figure 6:
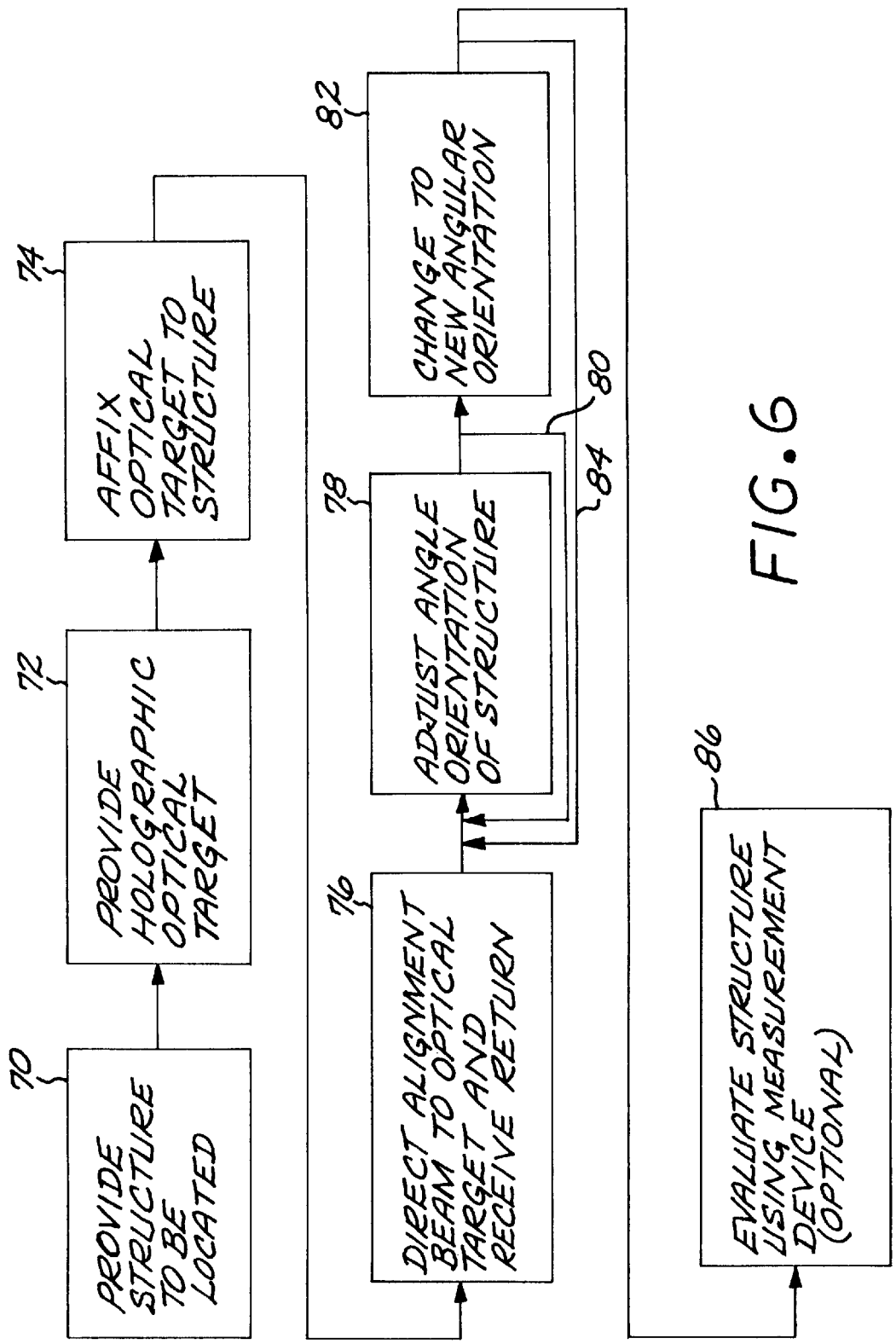
FIG. 6 is a block flow diagram of an approach for practicing the present invention.

FIG. 6 is a block flow diagram of an approach for practicing the present invention. The structure 22 to be located is provided, numeral 70, and the holographic optical target 28 is provided, numeral 72. The holographic optical target 28 may be of any of the types described herein, or any other operable holographic target configuration. The optical target 28 is affixed to the structure 22, numeral 74, by any operable approach, such as using an adhesive on the back side of the backing 32. The alignment beam 38 is directed from the light source 36 to the angular-reference hologram 30, and reflected back toward the measurement device 24 for measurement by any operable approach such as those discussed herein, numeral 76. The angular orientation of the structure 22 is adjusted, numeral 78, using an iterative process 80 as needed until the return intensity is maximum and the null angular position is reached. The directing step 76 and the adjusting step 78 may be performed sequentially or simultaneously, in each case either a single time or iteratively.

After the angular position of the structure 22 is located by this approach for a first one of the angular-reference holograms 30, any testing or service operations to be accomplished at this orientation are completed. Thereafter, if there are additional angular-reference holograms 30, the angle of the structure 22 may be changed to a new orientation associated with the approximate null of one of the other angular-reference holograms, numeral 82. The angular position is adjusted, numeral 78, for this new angular orientation until its null is reached. Any service or testing at this new angular orientation is then performed. This null-seeking procedure may be repeated as often as necessary, numeral 84, for the different angular orientations associated with the individual angular-reference holograms 30.

After these operations are complete, the optical target 28 may be left in place on the structure 22, or it may be removed and used on a different structure.

In the application of most interest to the inventor, the structure 22 itself comprises an optical element that is to be evaluated, such as a lens or an optical train. An advantage of the present invention is that the measurement device 24 may be used in the evaluation and testing of such a structure, in addition to its use for angularly aligning the structure 22, as long as the aperture 58 is sufficiently large so that the relevant portion of the structure 22 to be evaluated is within the field of view of the measurement device 24. In the approach of FIG. 6, the structure 22 is optionally evaluated using the measurement device, numeral 86.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for angularly locating a structure relative to a reference surface, the method comprising the steps of:

providing the structure to be angularly located relative to the reference surface;

providing an optical target having at least two reflective angular-reference holograms thereon, wherein each reflective angular-reference hologram has a different effective angular orientation;

affixing the optical target to the structure;

directing an alignment light beam against at least one of the angular-reference holograms on the optical target, and receiving a signal return of the alignment light beam at a measurement location of a measurement device; and adjusting the angular orientation of the structure to vary the signal return to correspond to an angular positioning of the alignment light beam relative to the reference surface.

2. The method of claim 1, wherein the structure is an optical element.

3. The method of claim 2, including an additional step, after the step of adjusting, of evaluating the optical element using the measurement device.

4. The method of claim 1, wherein the at least two reflective angular-reference holograms are spatially superimposed on each other on the optical target.

5. The method of claim 1, wherein the at least two reflective angular-reference holograms are spatially separated from each other on the optical target.

6. The method of claim 1, wherein the optical target is planar, and the effective angular orientation is perpendicular to a plane of the optical target.

7. The method of claim 1, wherein the step of adjusting includes the step of adjusting the angular orientation so that the signal return corresponds to normal incidence of the alignment light beam to the reflective angular-reference hologram.

8. The method of claim 1, wherein the steps of directing and adjusting are performed concurrently.

9. The method of claim 1, wherein the step of adjusting includes the steps of directing a reference light beam against the reference surface, and receiving a reflected light beam at the measurement location, and forming an interference pattern between the reference light beam and the reflected light beam.

10. A method for angularly locating a structure relative to a reference surface, the method comprising the steps of:

providing the structure to be angularly located relative to the reference surface;

providing an optical target having a reflective angular-reference hologram corresponding to an effective mirror planar surface thereon, the reflective angular-reference hologram having an effective angular orientation;

affixing the optical target to the structure;

directing an alignment light beam substantially perpendicular to the reference surface and incident upon the angular-reference hologram on the optical target, and receiving a signal return of the alignment light beam at a measurement location; and adjusting the angular orientation of the structure to vary the signal return to correspond to normal incidence of the alignment light beam to the effective angular orientation of the reflective angular-reference hologram.

11. The method of claim 10, wherein the optical target has at least two reflective angular-reference holograms thereon, with each reflective angular-reference hologram having a different effective angular orientation.

12. The method of claim 11, wherein the at least two reflective angular-reference holograms are spatially superimposed on each other on the optical target.

13. The method of claim 11, wherein the at least two reflective angular-reference holograms are spatially separated from each other on the optical target.

14. The method of claim 10, wherein the optical target is planar, and the effective angular orientation is perpendicular to a plane of the optical target.

15. The method of claim 10, wherein the step of adjusting includes the step of adjusting the angular orientation so that the signal return corresponds to normal incidence of the alignment light beam to the reflective angular-reference hologram.

16. A method for angularly locating a structure relative to a reference surface, the method comprising the steps of:

providing the structure to be angularly located relative to the reference surface;

providing an optical target having at least two reflective angular-reference holograms thereon, each of the reflective angular-reference holograms having an effective mirror surface with an effective angular mirror orientation different from that of each of the other reflective angular-reference holograms;

affixing the optical target to the structure;

directing an alignment light beam substantially perpendicular to the reference surface and incident upon one of the reflective angular-reference holograms on the optical target, and receiving a signal return of the alignment light beam at a measurement location; and adjusting the angular orientation of the structure to achieve a maximum signal return of the alignment light beam corresponding to normal incidence of the alignment light beam to one of the effective mirror surfaces of the reflective angular-reference holograms.

17. The method of claim 16, wherein the at least two reflective angular-reference holograms are spatially superimposed on each other on the optical target.

18. The method of claim 16, wherein the at least two reflective angular-reference holograms are spatially separated from each other on the optical target.

19. The method of claim 16, wherein the steps of directing and adjusting are performed concurrently.

20. The method of claim 1, wherein the step of affixing the optical target to the structure includes the step of affixing the optical target to the structure with an adhesive backing.

21. The method of claim, 10, wherein the step of receiving the signal return includes the step of viewing the signal return with a human eye.

* * * * *